United States Patent [19]

Aosaki et al.

[11] Patent Number: 5,467,198
[45] Date of Patent: Nov. 14, 1995

[54] METHOD FOR CONTROLLING AN IMAGE PROCESSING SYSTEM

[75] Inventors: Ko Aosaki; Yasuhiro Nishitani, both of Tokyo, Japan

[73] Assignee: Fuji Photo Film Co., Ltd., Kanagawa, Japan

[21] Appl. No.: 114,400

[22] Filed: Sep. 1, 1993

Related U.S. Application Data

[63] Continuation of Ser. No. 688,429, Apr. 22, 1991, abandoned.

[30] Foreign Application Priority Data

Apr. 20, 1990 [JP] Japan ................................. 2-105853
Apr. 20, 1990 [JP] Japan ................................. 2-105854

[51] Int. Cl.$^6$ ........................................................ H04N 1/00
[52] U.S. Cl. ........................... 358/400; 358/434; 358/468; 358/474
[58] Field of Search ............................ 358/400, 401, 358/407, 408, 409, 471, 474, 479, 909, 434, 436, 439, 468; 379/100

[56] References Cited

U.S. PATENT DOCUMENTS

| | | | |
|---|---|---|---|
| 3,914,537 | 10/1975 | Perreault et al. | 358/476 |
| 3,920,895 | 11/1975 | Vieri et al. | 358/407 |
| 4,399,470 | 8/1983 | Hibbard | 358/479 |
| 4,646,160 | 2/1987 | Iizuka et al. | 379/100 |

FOREIGN PATENT DOCUMENTS

| | | |
|---|---|---|
| 5078114 | 11/1948 | Japan . |
| 58-148561 | 9/1983 | Japan ................ 358/400 |
| 62-239658 | 10/1987 | Japan . |

*Primary Examiner*—Edward L. Coles, Sr.
*Assistant Examiner*—Thomas D. Lee
*Attorney, Agent, or Firm*—Young & Thompson

[57] ABSTRACT

A method for controlling an image processing system comprising a fax-terminal and an image scanner connected to each other involves producing image signals by the image scanner and inputting them into the fax-terminal. When the fax-terminal accesses a telephone circuit, and if an original document is set in the fax-terminal, an image of the original and then the image picked up by the image scanner are transmitted in succession by facsimile. If the fax-terminal does not access a telephone circuit, the image signals from the image scanner are supplied to the fax-terminal which makes a hard copy of the scanned image. When the scanned image has been transmitted, a hard copy of the transmitted image can be made by the fax-terminal after the access to the telephone circuit is released. The access between the telephone circuit and the fax-terminal is maintained for a predetermined time interval after one image frame has been picked up and transmitted. This access is continued if a reservation for the next image frame transmission is made within this time interval. It is therefore possible to pick up and transmit a plurality of images to a remote fax-terminal after inputting the address of that terminal once. When the fax-terminal receives a polling signal from a remote fax-terminal, the image scanner is actuated to pick up and transmit image signals to the remote fax-terminal.

9 Claims, 11 Drawing Sheets

METHOD FOR CONTROLLING AN IMAGE PROCESSING SYSTEM

This application is a continuation, of application Ser. No. 07/688,429, filed Apr. 22, 1991, now abandoned.

BACKGROUND OF THE INVENTION

1. Field of the Invention

The present invention relates to an image processing system comprising an image scanner and a facsimile terminal, and more particularly to a controlling method therefor which will render the image scanner and facsimile terminal highly efficient and versatile.

2. Description of the Prior Art

Image processing systems are described in Japanese Unexam. Utility Model Publ. No. 50-78114, Japanese Unexam. Patent Publ. No. 58-148561, Japanese Unexam. Patent Publ. No. 62-239658 etc., wherein image signals from a television camera are input to a facsimile terminal (hereinafter called simply a fax-terminal), and are transmitted to a remote fax-terminal through a telephone line. Because fax-terminals have come into wide use recently, it would be very convenient to control an image scanner to cooperate with a fax-terminal such that it would be possible to transmit a pictorial image of a subject, such as an image of a picture written on a black or white board, by facsimile transmission immediately after picking up that image, without taking a hard copy of the image.

However, the above-mentioned prior arts merely teach to transmit image signals from an image scanner such as a television camera, solid state imaging device or the like through a facsimile communication network, and there is no particular description about how to control the image scanner and the fax-terminals in cooperation with each other.

For example, because conventional fax-terminals are so designed that the access to the telephone line is automatically cut off after transmission of a set of originals is completed, when an image of a remote subject from the imaging device should also be transmitted to the same terminal following the originals it is necessary to operate dialing buttons of the fax-terminal so as to input the address of the remote terminal once again in order to transmit the image signals of the remote subject. This is certainly cumbersome.

Furthermore, no known prior art has suggested how to control the imaging device, the fax-terminal and the access to the telephone line in the case where the images of a plurality of remote subjects should be captured to transmit image signals of these subjects in a sequential manner.

Moreover, an image processing system comprising an imaging device and an associated fax-terminal would be still more useful if it were possible to actuate the imaging device to pick up an image of a remote subject and transmit it through the associated fax-terminal in response to a polling request from a remote fax-terminal. In this way, it would become possible, for instance, to provide a simple and inexpensive monitoring system which could monitor indicators by means of a remote fax-terminal that causes an imaging device to relay images of the indicators.

However, in the conventional image processing system described above, both the image scanner and the fax-terminal must be manually and directly operated, in order to transmit an image from the image scanner by facsimile.

SUMMARY OF THE INVENTION

In view of the foregoing, an object of the invention is to transmit by facsimile the image of an original document in succession with the image of a remote subject picked up by an image scanner, in a simple and easy operation.

Another object of the invention is to make a hard copy of the image of a remote subject picked up by the image scanner and transmitted by facsimile, without extending the access time to the telephone circuit.

A further object of the invention is to control a fax-terminal to act as a still image recording apparatus for printing out an image of a remote subject picked up by an image scanner.

Yet another object of the invention is to pick up and transmit a plurality of images in succession to a remote fax-terminal, after having designated the address of that remote fax-terminal only once.

A still further object of the invention is to provide a method for controlling an image scanner connected to a fax-terminal in accordance with a polling request sent from another remote fax-terminal, so as to transmit the image of a remote subject picked up by the image scanner to the remote fax-terminal.

To achieve the above and other objects, according to the present invention, an image scanner having an optical system and a line sensor which is movable in a direction perpendicular to a line of pixels thereof, picks up an image of a remote subject formed by the optical system and sends image signals of the remote subject to a fax-terminal. When the fax-terminal accesses a telephone line, and if an original document is positioned in the fax-terminal, the image of the original document and then the image picked up by the image scanner are sequentially transmitted through the telephone circuit upon a transmission start operation.

If the fax-terminal does not access the telephone circuit, the image signals from the image scanner are supplied to the printer of the fax-terminal so as to make a hard copy of the image picked up by the image scanner. Thus, the image scanner and fax-terminal can also serve as a still image recording apparatus.

When an image of a remote subject picked up by the image scanner has been transmitted, a hard copy of that image can also be made by means of the printer of the fax-terminal after the access between the telephone circuit and the fax-terminal has been cut off. For this purpose, it is possible to store the image signals of the remote subject in a memory while they are also being transmitted to the remote fax-terminal. In this way, it becomes unnecessary to extend the access time to the telephone circuit in order to make a hard copy of the transmitted image of the remote subject.

Furthermore, the access of the fax-terminal to the telephone circuit is maintained for a predetermined time interval after an image frame has been picked up and transmitted, so that the access to the telephone circuit is continued if a reservation for a subsequent image frame transmission is made within this time interval. Therefore, it becomes possible successively to pick up and transmit a plurality of image frames to a remote fax-terminal, while inputting the address of that terminal only once.

When the fax-terminal receives a polling signal from a remote fax-terminal, the fax-terminal actuates the image scanner to pick up and transmit an image to the remote fax-terminal through the telephone circuit. In this way, it is possible to actuate the image scanner by means of a polling signal sent from a remote fax-terminal so as to pick up and transmit an image to the remote fax-terminal even when there is no one present who can directly operate the image processing system. As a result, it is possible easily to monitor visual information, such as a display on an instrument board installed at a remote location, at any desired time by using facsimile transmission according to the method of the invention. Such a remote monitoring system is desirable and inexpensive.

BRIEF DESCRIPTION OF THE DRAWINGS

Other objects and advantages of the present invention will become more apparent from the following detailed description when read in conjunction with the accompanying drawings, in which.

DETAILED DESCRIPTION OF THE PREFERRED EMBODIMENTS

Figure 1:
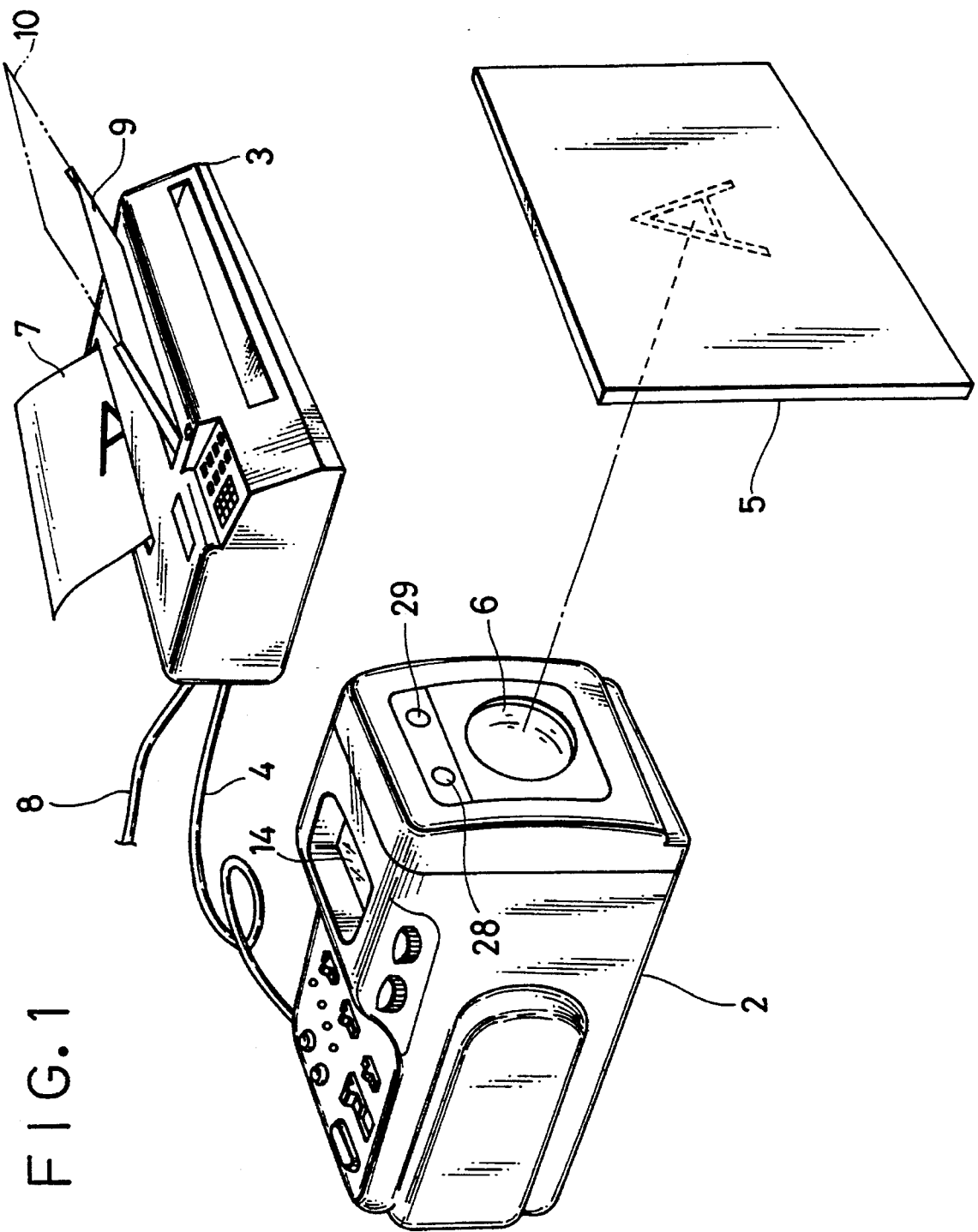
FIG. 1 is a perspective view of an image processing system for performing the method of the present invention.

Referring to FIG. 1, an image processing system according to the present invention comprises an image scanner 2 and a fax-terminal 3 which are electrically connected to each other through a cable 4. The image scanner 2 picks up a picture, such as a picture written on a white board 5, through a taking lens 6, and transfers image signals of that picture to the fax-terminal 3 through the cable 4. The fax-terminal 3 then prints out a hard copy 7 of that image, and/or transmits the image signals through a telephone circuit 8 as is described in more detail below.

As is well known, the fax-terminal 3 has a supporting member 9 for an original document 10 to be transmitted by facsimile (hereinafter called simply a fax-original). The fax-original 10 positioned on the support member 9 is scanned by a built-in line sensor of the fax-terminal 3, and the detected image signals are transmitted to a remote fax-terminal through the telephone circuit 8, when a transmission operation is effected. On the other hand, when the fax-terminal 3 receives image signals sent through the telephone circuit 8, a hard copy of the corresponding image is printed out by a built-in printer of the fax-terminal 3.

Figure 2:
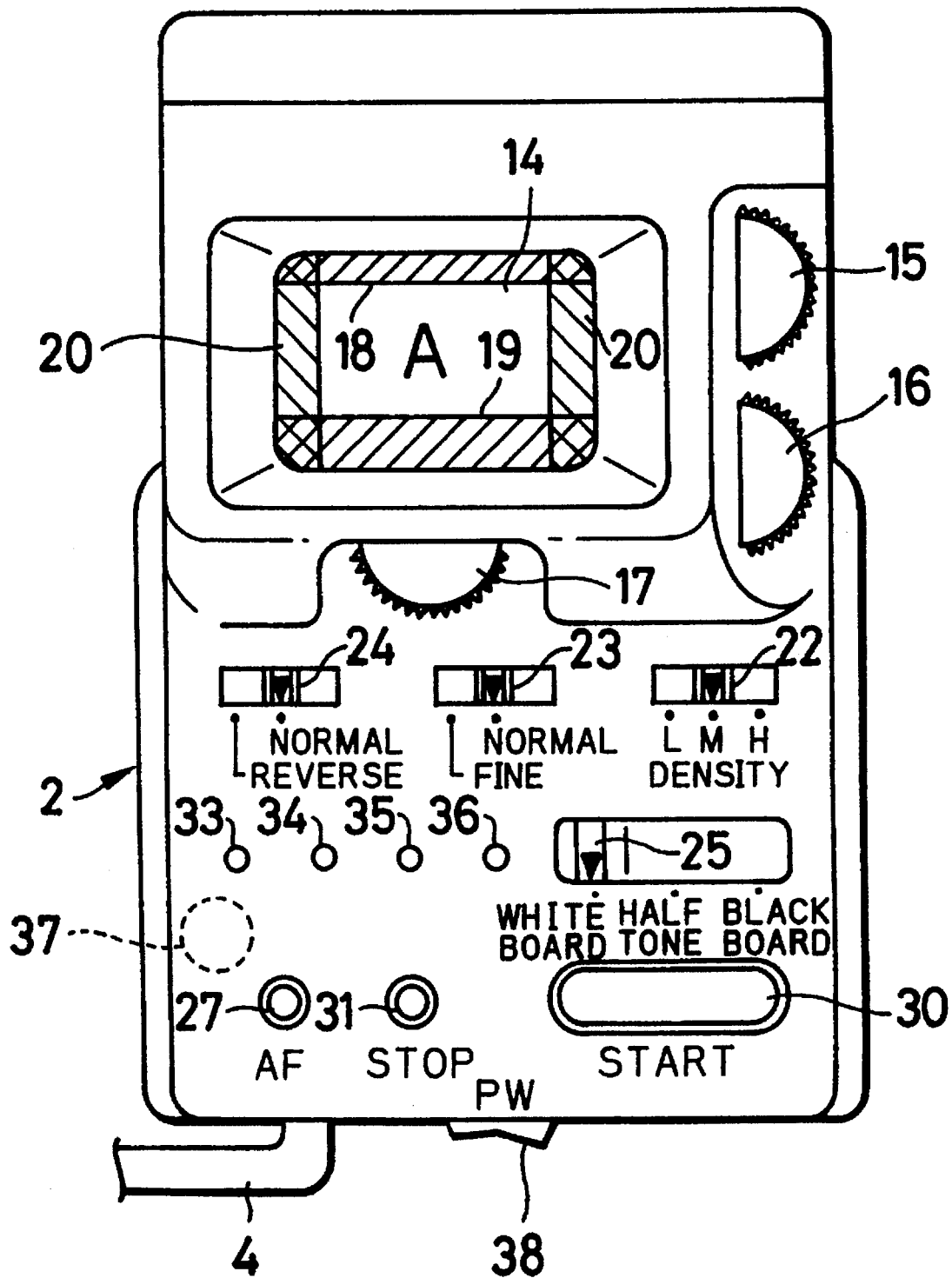
FIG. 2 is a plan view showing the control panel of the image scanner of FIG. 1.

Referring now to FIG. 2 showing a control panel built into the top of the image scanner 2, there is provided a screen 14 which displays the optical image formed by a lens 6. Adjacent the screen 14, trimming dials 15, 16 and 17 are provided for designating the area of the picked-up image to be recorded, by using masking plates 18 and 19 that can be moved individually within the screen 14 by rotating the trimming dials 15 and 16, respectively, and a pair of masking plates 20 that can be moved simultaneously and symmetrically relative to the center line of the screen 14 by rotating dial 17. In this way, it is possible to trim the picked-up image while monitoring the trimming area of the screen 14, such that the unmasked area of the image which is not covered by the masking plates 18 to 20 constitutes an effective image area that is processed by the image scanner 2.

A density control knob 22 is provided to control the density of the hard copy 7 of the image picked up by the image scanner. A resolution control knob 23 is provided to change the resolution of the image scanner 2 between a normal mode and a fine mode, whereas a reverse print knob 24 is provided to change between negative and positive images during printing. A subject tone control knob 25 is provided to change the image processing mode according to the subject, for example, depending on whether the subject is written on a white board or a black board, and whether the density gradation of the subject includes half-tone images.

An AF button 27 is depressed for focusing the lens 6. As shown in FIG. 1, the image scanner 2 is provided on the front with a light projector 28 and a light receiver 29 which constitute an active distance measuring device, so that the distance to the white board 5, for instance, is detected upon depression of the AF button 27, and the lens 6 is moved according to the detected distance. A start switch 30 is depressed to actuate the image scanner 2, while a stop switch 31 is depressed to stop the operation of the image scanner 2.

A start LED 33, a communication LED 34 and a copy LED 35 are provided for indicating whether the image scanner 2 is in operation, whether the fax-terminal is ready for transmission, and whether the fax-terminal is enabled to make a hard copy, respectively. Furthermore, an alarm LED 36 is provided as a visual alarm, in addition to a buzzer 37 as an audible alarm. Reference 38 designates a power switch for the image scanner 2.

Figure 3:
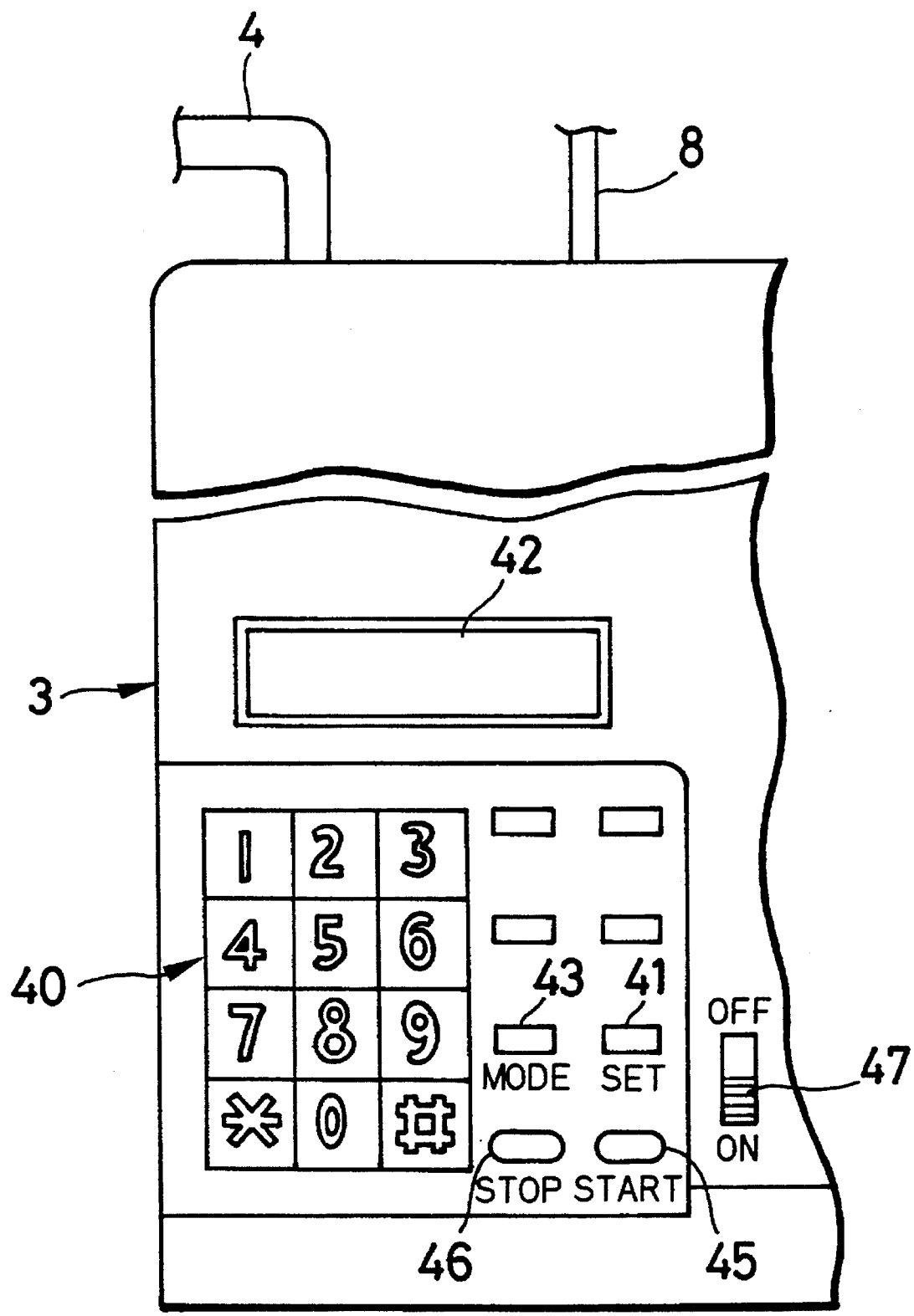
FIG. 3 is a plan view showing the control panel of the fax-terminal of FIG. 1.

FIG. 3 shows the control panel of the fax-terminal, wherein a pushbutton dialing keypad 40 including alphanumeric keys and function keys is used to input the address of remote fax-terminal to which image signals should be transmitted, and to input a private identification number specific for polling. A set switch 41 is operated so that the image scanner 2 can be actuated in response to a polling signal transmitted to the fax-terminal 3 through the telephone circuit 8 when the image scanner 2 is connected to the fax-terminal 3. The set switch 41 is also operated to decide whether a hard copy 7 of an image picked up by the image scanner 2 should be made after transmitting that image through the telephone circuit 8.

The switching condition of these switches is displayed on a liquid crystal display panel 42. A mode switch 43 is provided to change over the transmission mode of image signals between a fine mode and a normal mode, and also to select a print mode for the built-in printer from among a fine mode and a normal mode.

A start switch 45 and a stop switch 46 may be manually operated to start and stop the facsimile transmission, respectively. But it is also possible to effect the actuation and deactuation of the image scanner 2 by means of these switches 45 and 46 when the image scanner 2 is connected to the fax-terminal 3. Upon depression of the start switch 45 after a fax-original 10 is positioned on the support member 9 and an address is input by means of the keypad 40, the fax-terminal 3 accesses the telephone circuit 8 thereby to transmit the image signals of the fax-original 10. Even when no fax-original is in place, if the image scanner 2 is effectively connected to the fax-terminal 3, the fax-terminal 3 accesses the telephone circuit 8. When the knob 47 is switched off, the connection between the image scanner 2 and the fax-terminal 3 becomes ineffective, even if they are physically connected to each other by cable 4.

Figure 4:
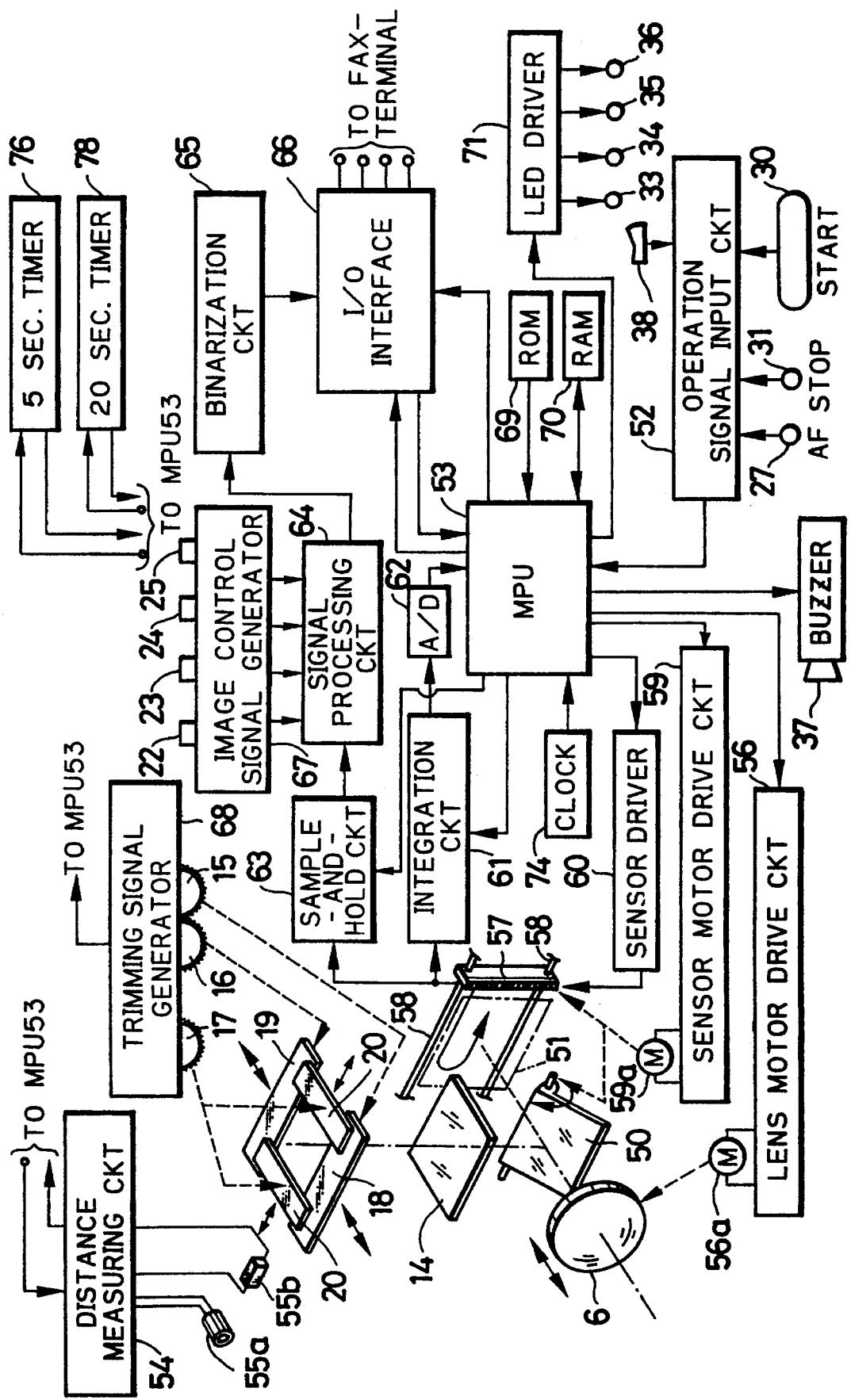
FIG. 4 shows schematically the overall construction of the image scanner.

FIG. 4 shows the overall construction of the image scanner 2, wherein a movable mirror 50 is provided to reflect light from the lens 6 toward the screen 14. The mirror 50 can be rotated about an axis from a lowered position as shown in FIG. 4 to a raised position as is indicated by an arrow. The screen 14 is disposed in a plane that is optically equivalent to the image plane of the lens 6, so that it is possible to confirm whether the lens 6 focuses on a principal subject by observing the image on the screen 14.

If it is necessary to focus the lens 6, the AF button 27 is depressed to input a focusing command to a MPU 53 through an operation signal input circuit 52, thereby to actuate a distance measuring circuit 54. As a result, an active distance measurement is performed by means of a near-infrared light-emitting diode 55a and a PSD (semiconductor position sensitive device) 55b, thereby to detect distance data corresponding to the subject distance. The distance data is supplied as a digital value to the MPU 53, which then actuates a lens drive circuit 56, so that a stepping motor 56a is driven to move the lens 6 into a position corresponding to the distance data.

Behind the mirror 50, a line sensor 57 including a column of pixels is moved step by step horizontally along a pair of guide bars 58 when a stepping motor 59a is driven by a sensor motor drive circuit 59. The number of pixels of the line sensor 57, that is, the number of pixels in each scanning line, is 1400, whereas the number of the scanning lines for each frame is 1906, so that it is possible to detect data on at most about 2,670,000 pixels per frame. The initial position of the line sensor 57 is out of the image plane 51, and the mirror 50 is moved by the stepping motor 59a upward to a position in which light passing through the lens 6 is allowed to reach the image plane 51, while the line sensor 57 is moved toward the image plane 51.

The MPU 53 start to supply a clock pulse signal to a sensor driver 60 upon the line sensor 57 moving into the image plane 51, thereby first starting a brightness measurement, that is, pre-scanning. During pre-scanning, the line sensor 57 is driven for a predetermined charge storage time at each scanning position thereby to perform photoelectric conversion and to output electric signals corresponding to pixels of a scanning line. The photoelectric signals are integrated for each scanning line by an integrator 61 in synchronism with the clock pulse signals supplied to the sensor driver 60, and thereafter are converted in an A/D converter 62 into integration data of each line which are sent to the MPU 53. In this way, integration data of all the scanning lines within the image plane 51 have been detected till the line sensor 57 has been moved stepwise from one end to the opposite end of the image plane 51, that is, from the right to the left end in FIG. 4. Because the integration data represent the brightness of the image portion corresponding to the respective scanning line positions, it is possible to determine a suitable charge storage time for each scanning line position on the basis of the integrated data. Data on the calculated charge storage times for the respective scanning line positions are stored in a RAM 70.

After having been moved into the left end position of the image plane 51, the line sensor 57 is then moved stepwise in the opposite direction. During moving-to the right, the line sensor 57 performs an actual imaging process for image transmission or image recording, that is, main-scanning. It is to be noted that the sensor driver 60 is driven based on a clock pulse signal supplied form the fax-terminal 3 during the actual imaging process, whereas the sensor driver 60 is driven based on the clock pulse signal generated inside the image scanner 2, as is described in more detail hereinafter.

Photoelectrically detected signals are sent to a sample-and-hold circuit 63 in the actual imaging process. The sample-and-hold circuit 63 is supplied with a sampling pulse signal which is in synchronism with the clock pulse signal supplied to the sensor driver 60, so that a photoelectric signal for each pixel is sampled. The photoelectric signals are converted into digital values in a signal processing circuit 64, and are sent in serial form to a binarization circuit 65. The binarization circuit 65 compares the digital values with a predetermined threshold level so as to convert each digital value into a "0" or "1" signal representative of a white or black level, respectively, and outputs these binary signals as image signals. The image signals are temporarily stored line-by-line in a serial input/output register of an I/O interface 66, and then are transferred therefrom to the fax-terminal 3 in response to a transfer pulse from the MPU 53.

The signal processing circuit 64 not only performs the analog/digital conversion of the photoelectric signals from the line sensor 57, but also processes the signals in accordance with image control signals from an image control signal generator 67 which outputs image control signals according to the settings of the density control knob 22, the resolution control knob 23, the reverse print knob 24 and the subject tone control knob 25. If, for example, the density control knob 22 is set in a high density position, the signal processing circuit 64 adds a predetermined level to the photoelectric signals. If the resolution control knob 23 is set in the normal mode, the signal level of each pixel of a scanning line is added to another signal level detected by the same pixel in the next scanning line, and the average level of these two pixels is converted into a digital value. If, on the contrary, the resolution control knob 23 is set in the fine mode, the signal level of each individual pixel is converted into a digital value for each scanning line.

If the subject tone control knob 25 is set in the white board position or in the black board position, the signal processing circuit 64 converts the photoelectric signals into digital values such that characters and pictures written on a white or black board are printed as a black image on a white background or vice-versa, respectively. When the subject tone control knob 25 is set in the half-tone position, the digital/analog conversion of the photoelectric signals is performed according to a dither technique.

By operating the trimming dials 15 to 17, a trimming signal generator 68 outputs to the MPU 53 trimming signals corresponding to the positions of the masking plates 18 to 20. Based on the trimming signals, the MPU 53 determines which scanning lines belong to the effective scanning area in the paper feed direction, and which of the photoelectric signals of each line from the line sensor 57 belong to the effective image area in the scanning direction, such that only the photoelectric signals belonging to the effective image area are processed as the image signals.

A ROM 69 stores sequence programs for executing the above imaging process. A RAM 70 is used for temporary storage of various data and flags obtained during execution of the imaging process, as well as the above-described charge storage time data and the like. An LED driver 71 drives, upon receipt of signals from the MPU 53, any of the above-described LEDs 33 to 36 in an appropriate emission pattern depending on the type and content of the signals. Reference 74 designates a clock pulse generator for outputting a clock pulse signal to the MPU 53. Timers 76 and 78 are used to pick up a plurality of images in succession with the image scanner 2, and to transmit them sequentially by facsimile.

Figure 5:
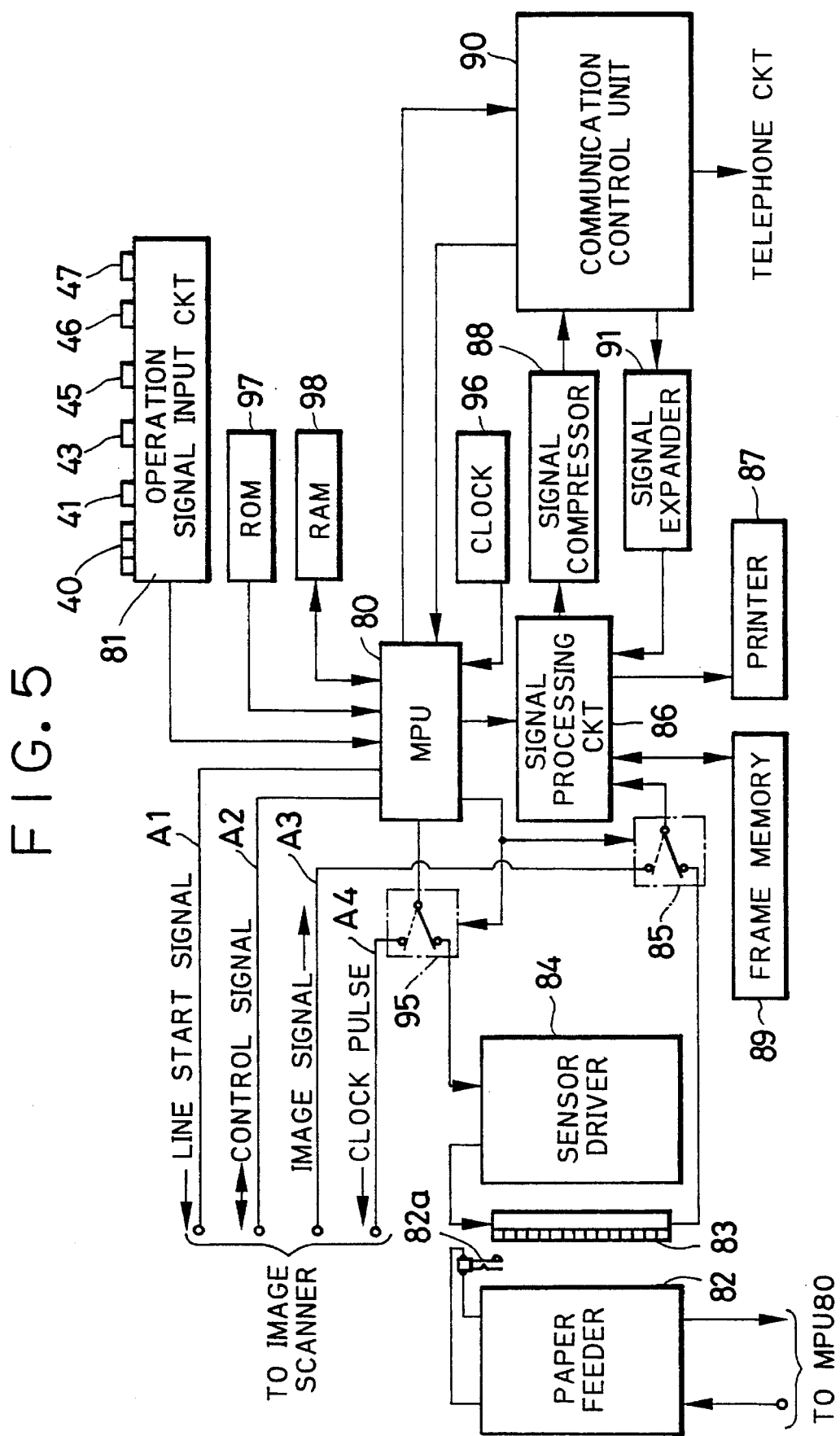
FIG. 5 shows schematically the overall construction of the fax-terminal.

The fax-terminal 3 is constructed as shown in FIG. 5. The fax-terminal 3 is connected to the image scanner 2 through signal lines A1, A2, A3 and A4, which may be confined within the cable 4 of FIG. 1. The signal line A1 is for sending a line start signal to the image scanner 2 (the function of the line start signal will be described below). The signal line A2 is used for data communication between these apparatuses. Signal line A3 is for receiving image signals from the image scanner 2, whereas the signal line A4 is for sending the clock pulse signal to the image scanner 2. MPU 80 receives operation signals from the dialling keypad 40, the set switch 41, the mode switch 43, the start switch 45 and the stop switch 46, all shown in FIG. 3, through an operation signal input circuit 81, and controls respective sections of the fax-terminal 3 depending on the operation signals.

A paper feeder 82 includes a micro-switch 82a so that when a fax-original 10 is positioned on the support member 9 (FIG. 1) the paper feeder 82 feeds the fax-original 10 sheet-by-sheet into the fax-terminal body. As is well known, the fax-terminal 3 has a stationary built-in line sensor 83 for picking up the image of the fax-original 10 while contacting the fax-original 10. The pixels of the line sensor 83 are arranged side-by-side in a direction perpendicular to the paper feed direction. The line sensor 83 is driven by a sensor driver 84 which is controlled by a clock pulse signal supplied by the MPU 80.

Photoelectric signals generated by the line sensor 83 are sent to a signal processing circuit 86 via a changeover switch 85. The signal processing circuit 86 converts the photoelectric signals into image signals by converting them into binary signals with reference to a threshold value and by subjecting them to other processes. The signal processing circuit 86 outputs the image signals to a printer 87, a signal compressor 88 and a frame memory 89, according to commands from the MPU 80.

The printer 87 is provided with a conventional thermal head comprising heating elements aligned in a row, and effects thermal recording line-by-line on a thermo-sensitive recording paper while feeding the paper stepwise in a direction perpendicular to the row of the heating elements, according to the image signals supplied line-by-line from the signal processing circuit 86, thereby to print out line-byline a hard copy 7 of the image. The signal compressor 88 performs signal compression in order efficiently to send the image signals through the telephone circuit 8. The frame memory 89 is capable of storing at least several frames of image signals, and stores image signals sent through the telephone circuit 8 as well as image signals transferred from the image scanner 2.

It is to be noted that signal processing circuit 86 processes the photoelectric signals detected by the line sensor 83 in the above-described way, but does not process the image signals supplied from the image scanner 2 when the changeover switch 85 is switched into its other position shown by dashed line in FIG. 5, whereby image signals from the image scanner 2 are transferred to the printer 87, the signal compressor 88 and the frame memory 89 through the signal processing circuit 86.

A communication control unit 90 subjects the compressed image signals to signal modulation such as coding and sends them to the telephone circuit 8, or receives image signals sent through the telephone circuit 8, and decodes and sends the received image signals to a signal expander 91. The signal expander 91 expands the compressed image signals, and send them to the signal processing circuit 86, wherein the image signals sent through the telephone circuit 8 in this way are transferred to the printer 87 or to the frame memory 89 without being processed, as with image signals received from the image scanner 2.

The MPU 80 switches a changeover switch 95 between two switching positions drawn by solid line and dashed line, respectively, simultaneously with changing over the above-described changeover switch 85. The fax-terminal 3 operates based on a clock pulse signal from a clock pulse generator 96. When the changeover switch 95 is changed to the dashed line position, the clock pulse signal from the clock pulse generator 96 is sent also to the image scanner 2, so that the above-described image scanning and transmitting processes in the image scanner 2 are executed based on that clock pulse signal. A ROM 97 stores a program sequence for the operation of the fax-terminal as described above, whereas a RAM 98 temporarily stores various data and flags produced during operation of the fax-terminal 3.

The image scanner 2 and the fax-terminal 3 are actuated while being electrically connected to each other through the connecting cable 4. The operation of this image processing system will now be described with respect to several specific functions.

In order to pick up and transmit an image of a picture written on the white board 5, first an address is input using the dialing keypad 40 of the fax-terminal 3. Then the image scanner 2 is set to aim at the white board 5. The operator can effect framing and focusing, while observing the desired image on the screen 14. In focusing, the distance measuring circuit 54 and the lens motor drive circuit 56 are sequentially actuated to focus the lens 6 upon depression of the AF button 27. If the distance from the image scanner 2 to the white board 5 is too short or too long to be compensated by the lens motor 56a, the MPU 53 actuates the buzzer 37 to generate an audio alarm.

When the lens 6 is focused on the subject, the operator can determine a trimming area by operating the dials 15 to 17 while observing the screen 14. The respective operated amounts of the dials 15 to 17 are applied to the MPU 53 in the form of digital trimming data through the trimming signal generator 68. The MPU 53 decides depending on the trimming data the area within which the line sensor 57 should be moved in the horizontal direction, as well as the effective area in the vertical direction of the photoelectric signals from the pixels.

Thereafter, when the start switch 30 of the image scanner 2 or the start switch 45 of the fax-terminal 3 is depressed, an actuation signal is input to the MPU 80 of the fax-terminal 3 either directly or through the signal line A2. The MPU 80 then checks with reference to the micro-switch 82a whether a fax-original 10 is positioned on the support member 9, and when there is a fax-original 10, the changeover switches 85 and 95 are set in the solid line position of FIG. 5, so that a standard facsimile transmission is performed.

After the standard facsimile transmission is completed, or when no fax-original is on the support member 9, the MPU 80 automatically throws the switches 85 and 95 to the dashed line positions so as to actuate the image scanner 2, such that the MPU 80 of the fax-terminal 3 outputs a serial data code for actuating the MPU 53 of the image scanner 2 through the signal line A2.

Figure 6:
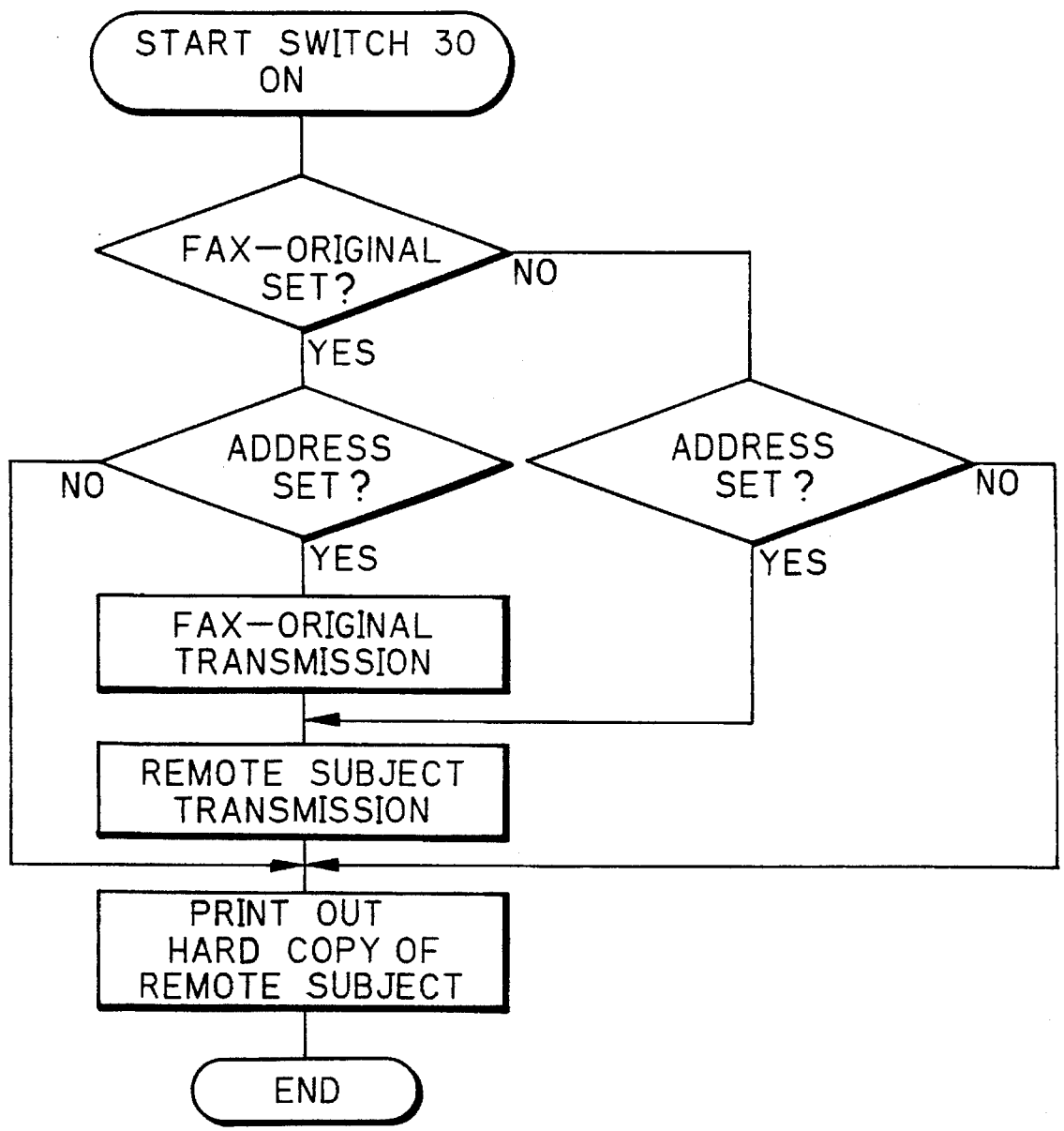
FIG. 6 is a flow chart of a sequence for transmitting the image of an original document and/or the image of a remote subject successively upon operating the image scanner.
Figure 7:
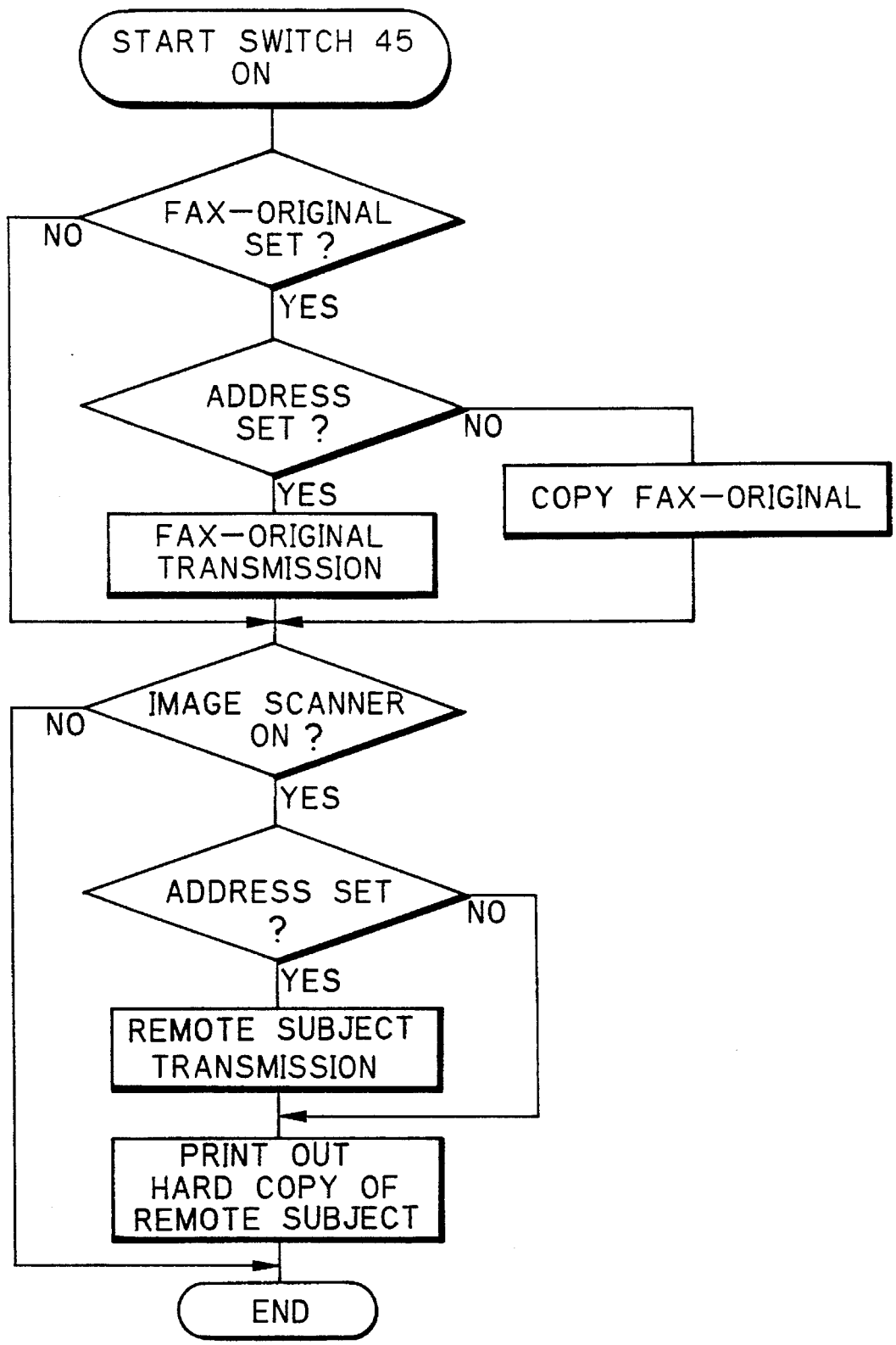
FIG. 7 is a flow chart of a sequence for transmitting the image of an original document and/or the image of a remote subject successively upon operating the fax-terminal.

In case the image of the picture on the white board 5 should be transmitted following the image of the fax-original 10, the transmitting process is executed according to either one of the sequences shown in FIG. 6 or 7 depending on which of the start switches 30 or 45 is operated.

When operating the start switch 30 of the image scanner 2 as shown in FIG. 6, the operator must first set the fax-original 10 on the support member 9. Then, the microswitch 82a is switched on, and the MPU 80 changes over the switches 85 and 95 to the solid line positions of FIG. 5 upon receipt of an ON signal from the micro-switch 82a. Thereafter, when the address of a remote terminal is input by means of the dialing keypad 40, the fax-terminal 3 becomes ready for transmission, thereby outputting a serial code data indicating this condition to the image scanner 2 through the signal line A2. Then the image scanner 2 is set to aim at the white board 5, and framing, focusing and trimming are carried out in the above-described manner.

Upon depression of the start switch 30 of the image scanner 2 in this condition, the actuating signal is applied to the MPU 80 of the fax-terminal 3 through the signal line A2, so that the transmitting process is executed according to the flowchart of FIG. 6. The fax-original 10 is scanned by the line sensor 83 while being fed by the paper feeder 82 at a constant speed, and the photoelectric signal from the line sensor 83 is supplied through the changeover switch 85 set in the solid line position of FIG. 5 to the signal processing circuit 86, wherein the photoelectric signal is processed into an image signal through a binarization process and the like. The image signal is sent to the telephone circuit 8 through the signal compressor 88 and the communication control unit 90, and is transmitted through the telephone circuit 8.

When the transmission of the fax-original 10- is completed, the MPU 80 of the fax-terminal changes over the switches 85 and 95 into the dashed line positions of FIG. 5 so as to send serial data indicative of the completion of the fax-original transmission to the image scanner 2 through the signal line A2. The image scanner 2 then starts operation.

In operation of the image scanner 2, first the stepping motor 59a is driven by the sensor motor drive circuit 59 to move the line sensor 57 stepwise from its initial position out of the image plane 51 to the left, while the mirror 50 is moved upward so as to allow the light passing through the lens 6 to reach the image plane 51. Upon moving into the image plane, the line sensor 57 begins to pick up an image formed on the image plane 51 so as to measure the brightness of the image, that is, pre-scanning. Photoelectric signals output from the line sensor 57 until it reaches the main-scanning start position at the left end of the image plane 51, are converted by the integrator 61 and the A/D converter 62 into integration data for each scanning line. Based on the integration data of each scanning line, the MPU 53 calculates a charge storage time for each scanning line position of the main-scanning, and stores the charge storage time data in the RAM 70.

When the line sensor 57 moves into the main-scanning start position, serial data indicative of the completion of pre-scanning is sent to the MPU 80 of the fax-terminal 3 through the signal line A2. Upon receipt of this serial data, the MPU 80 outputs a first line start signal on the signal line A1, and also outputs the clock pulse signal on the signal line A4. Upon receipt of the first line start signal from the fax-terminal 3, the stepping motor 59a reverses its rotational direction to move the line sensor 57 stepwise from the left to the right in FIG. 4, while the line sensor 57 picks up the image in synchronism with the clock pulse signal from the fax-terminal 3. At each scanning line position, the data of the charge storage time predetermined therefor is read out form the RAM 70, and is also sent to the fax-terminal 3 through the signal line A2. The fax-terminal 3 outputs a next line start signal on the signal line A1 in a timing determined with reference to this charge storage time data.

Photoelectric signals output from the line sensor 57 for each line are converted into binary image signals by the sample-and-hold circuit 63, the signal processing circuit 64 and the binarization circuit 65. The binary image signal of each line is temporarily stored in the register of the I/O interface 66, from which the image signals are transferred line-by-line to the fax-terminal 3 in response to a transfer pulse (500 kHz) supplied from the MPU 53 to the I/O interface 66 in synchronism with the clock pulse signal from the fax-terminal 3.

The image signals transferred to the fax-terminal 3 are input through the changeover switch 85, which is now set in the dashed line position of FIG. 5, to the signal processing circuit 86 and are transferred therefrom immediately to the signal compressor 88, and then sent to the telephone circuit 8 through the communication control unit 90.

When the start switch 45 of the fax-terminal is operated, a similar operation as described above is performed according to the sequence shown in FIG. 7. In FIG. 7, when no address signal is input prior to operating the start switch 45 of the fax-terminal 3, although a fax-original 10 is positioned on the supporting member 9, a hard copy of the fax-original 10 is printed out. If, at that time, the image scanner 2 is switched on, a hard copy of an image picked up by the image scanner will also be printed out following the hard copy of the fax-original 10, without performing facsimile transmission.

The fax-terminal 3 itself is in general so constructed as to release the access to the telephone circuit 8 automatically when a transmission of a fax-original 10 is completed. But if the image scanner 2 is switched on, it is possible to transmit the image signals picked up by the image scanner 2 in succession with the image signals of the fax-original 10, so that it is necessary to operate the keypad 40 for access to the telephone circuit 8 only once for each transmission to the same address. In this way, high efficiency of transmission can be achieved. The image processing system according to this embodiment is, therefore, very convenient, for example, for the purpose of transmitting a facsimile invoice before transmitting an image picked up by the image scanner 2.

It is desirable for the sender of a transmission to get a hard copy for his records of an image picked up by the image scanner 2 and transmitted by facsimile. For this reason, according to an embodiment of the present invention, the printer 87 of the fax-terminal 3 always prints out a hard copy 7 of the image picked up by the image scanner 2 unless the set switch 41 has been set to prevent the printing of images from the image scanner 2. The printing of the hard copy 7 is effected after the cutting off of access to the telephone circuit 8, in order to reduce the access time to the telephone circuit 8, and the image signals are kept stored in the frame memory 89 during the printing.

It may be possible to omit the frame memory 89 so as to reduce the cost for the system. In that case, the hard copy of the image from the image scanner 2 can be made by reactuating the image scanner 2 after the telephone circuit 8 is cut off following the transmission of the image signals from the image scanner 2.

Furthermore, as shown in FIG. 6, if no address signal has been input, the printer 87 of the fax-terminal 3 prints out a hard copy 7 of the image picked up by the image scanner 2 after having depressed the start switch 30 of the image scanner 2 even when a fax-original 10 is positioned on the support member 9. Thus, the fax-terminal 3 functions as a printer of the image scanner 2 in this case, so that the image processing system of the invention can also be used as a still image recording apparatus. The operating states of the image scanner 2 and of the fax-terminal 3 are monitored by each other through the signal line A2, so that the operation of one does not interfere with the sequential operation of the other. For example, it is natural that the operation of the image scanner 2 is ineffective while the fax-terminal 3 is transmitting or receiving signals from the telephone circuit 8.

Figure 8:
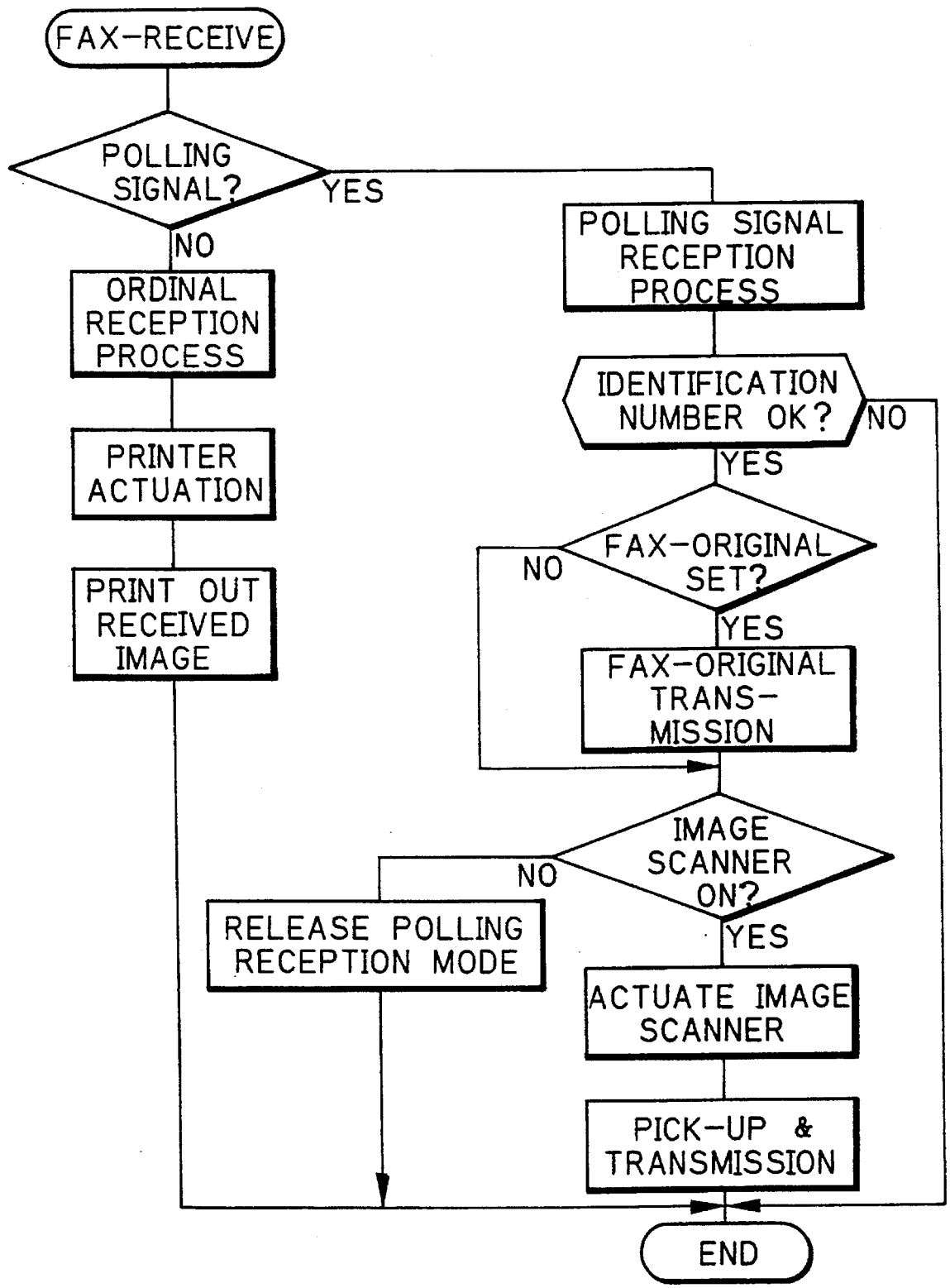
FIG. 8 is a flow chart of a polling sequence for the image processing system.

FIG. 8 shows a sequence for controlling the above-described image processing system when the system receives a polling signal. To set the system in a polling receive mode, the power switch 38 of the image scanner 2 is switched on, the knob 47 of the fax-terminal 3 is switched on, the set switch 41 is set in a polling receive mode position, and an identification number for polling is input by means of the dialling keypad 40. This number is memorized in the RAM 98 for comparison with a polling number sent from a sender along with a polling signal.

When a polling signal is sent to the fax-terminal 3 through the telephone circuit 8, the communication control unit 90 outputs command data to the MPU 80. Upon receipt of the command data, the MPU 80 executes a polling receive process, wherein a polling number received following the polling signal is compared with the polling number stored in the RAM 98. If the received polling signal coincides with the stored polling signal, the image processing system executes a transmission process according to the above-described transmission sequence. First, it is determined whether a fax-original 10 is positioned on the support member 9, and if there is a fax-original 10, the image of the fax-original 10 is transmitted. Thereafter, the image scanner 2 is actuated to pick up an image frame, thereby to transmit the image signals thereof.

Because the polling receive mode is maintained as long as the image scanner 2 is switched on, the remote fax-terminal of the polling signal sender can repeatedly receive images from the image scanner 2 by sending the polling signal again and again. Accordingly, by setting the remote fax-terminal in a time appointed polling mode wherein polling signals are sent to the fax-terminal 3 connected to the image scanner 2 at regular intervals using an interval timer, it becomes possible to transmit images picked up by the image scanner 2 to the remote fax-terminal automatically and at regular intervals, without the need for ongoing manual operation of either terminal. In this way, the image scanner 2 can be actuate in response to a command signal from the remote fax-terminal, so that the image processing system of the invention can serve as a simple and convenient monitoring system.

As shown in FIG. 8, the fax-terminal 3 receives ordinal signals in the absence of a polling signal, the printer 87 being actuated in that case to print out a hard copy according to the received image signals in a conventional manner. If a polling signal is received but the image scanner 2 is not switched on, then of course image is picked up by the image scanner 2. In that case, if a fax-original 10 is positioned on the support member 9, the image of the fax-original is transmitted in response to the polling signal, and thereafter the polling receive mode is released. If no fax-original is positioned, then the polling receive mode is released. In this way, it is possible to perform conventional facsimile transmission of the fax-original 10 according to the polling request.

Figure 9:
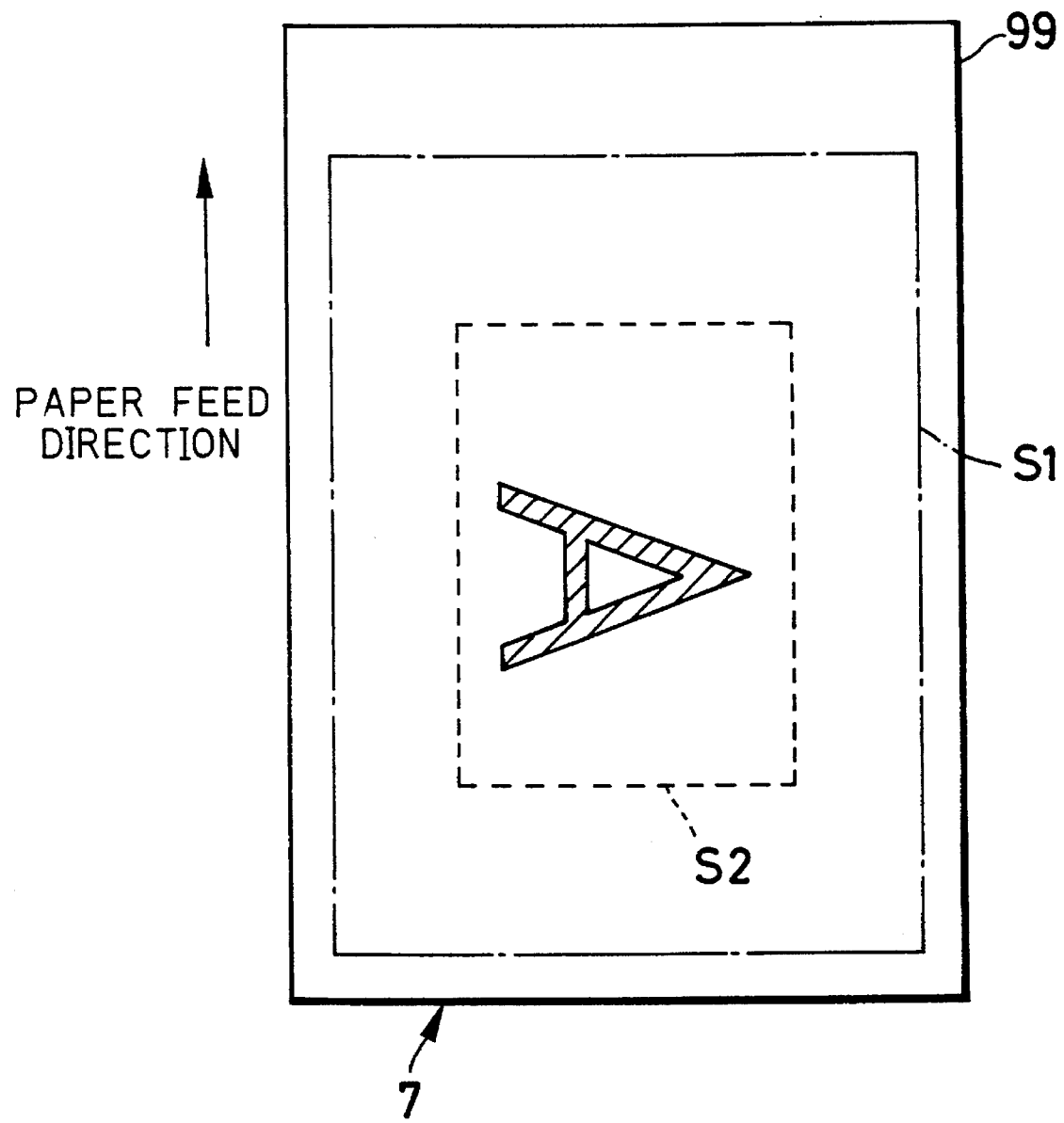
FIG. 9 is an explanatory view showing a hard copy of the image of a remote subject picked up by the image scanner.

Referring now to FIG. 9, a hard copy 7 of an image picked up by the image scanner 2 is, according to a preferred embodiment of the invention, always printed on a sheet of A4 size paper. The maximum print area S1 corresponds to the image frame prior to any trimming by the masking plates 18 to 20 of FIG. 4, while the minimum print area S2 corresponds to the image frame after maximum permissible trimming. The predetermined print area of the printer 87 coincides with the maximum print area S1 exclusive of any information printing areas such as a date printing area. When no trimming has been done, the image picked up by the image scanner 2 is printed in the maximum print area S1 on a recording paper 99. On the other hand when the image frame has been trimmed to the minimum size, a hard copy having the trimmed image printed in the minimum print area S2 is made.

When the image frame is trimmed, the MPU 53 of the image scanner 2 outputs a control signal to the MPU 80 of the fax-terminal 3 according to the trimming signal from the trimming signal generator 68. In response to that control signal, the MPU 80 controls the printer 987 so as to feed the recording paper 99 in the paper feed direction without driving the thermal head until the leading margin of the designated print area, the minimum print area S2 for instance, is detected. In the scanning direction, that is, the direction perpendicular to the paper feed direction, the signal processing circuit 64 of the image scanner 2 distinguishes unnecessary photoelectric signals from the line sensor 57 that belong to the trimming area outside the designated print area of the image, in accordance with the trimming signal, and assigns all these unnecessary photoelectric signals to the white level, such as a "0" signal. Therefore, the binary image signals corresponding to the trimming area become white level irrespective of their actual level, so that the image is printed within the designated print area S2 even though the printer 87 operates in an ordinal manner. The trimming signal generator 68 outputs a trimming signal corresponding to an appropriate trimming position defined by the masking plates 18 to 20, more specifically by the trimming dials 15 to 17, so that no special control of the printer 87 is required regardless of which print area is selected within a range between the maximum and the minimum print area S1 and S2.

Figure 10:
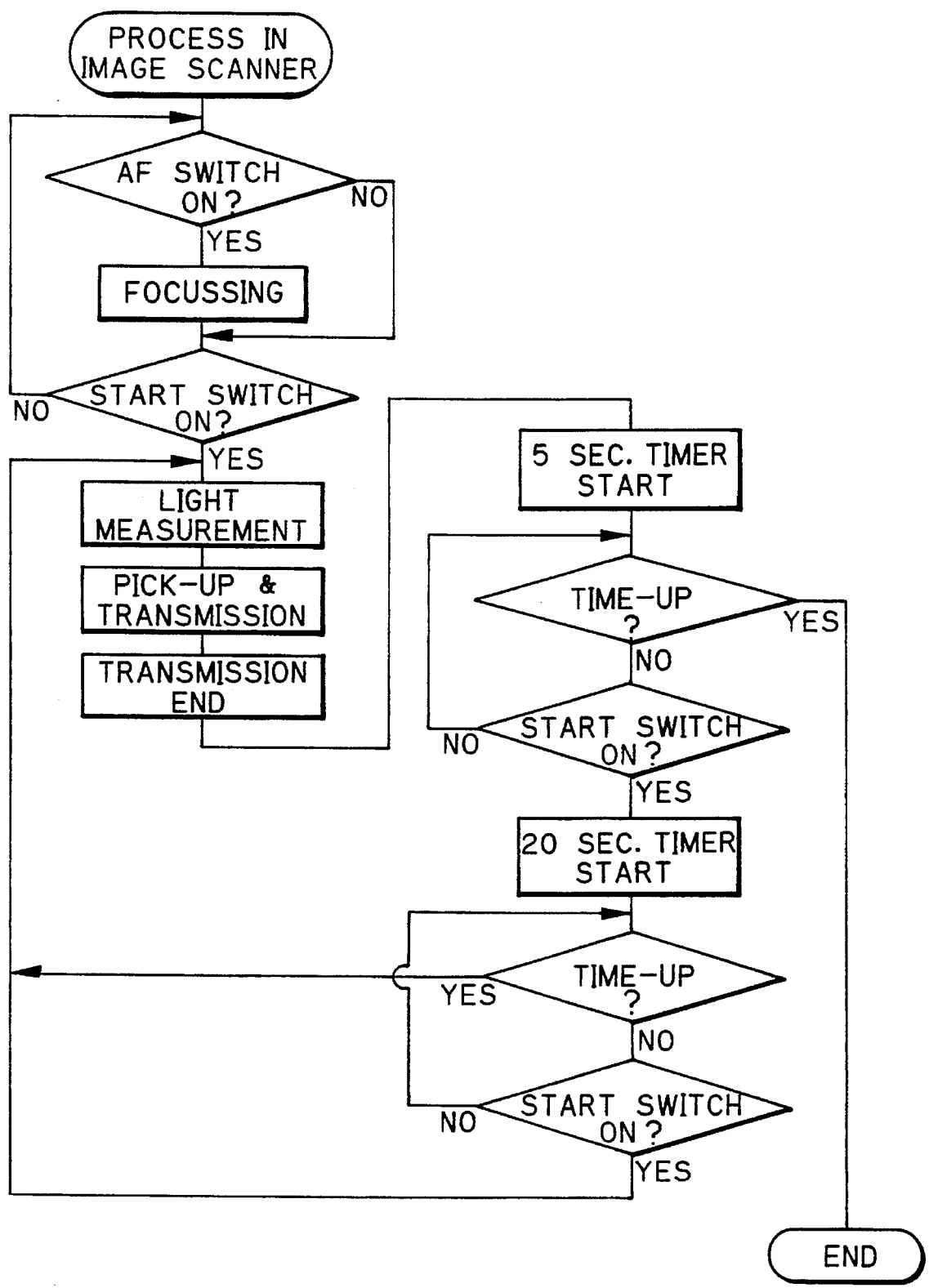
FIG. 10 is a flow chart of a sequence for picking-up and transmitting a plurality of images of remote subjects.

Next, a function of the image processing system for successively picking up and transmitting a plurality of images will be described with reference to FIGS. 10 and 11. This function is convenient when, for example, several pages of a book or pamphlet are to be transmitted. For this purpose, the image scanner 2 may be positioned on an elevated surface with its lens system directed downward to the book.

Figure 11:
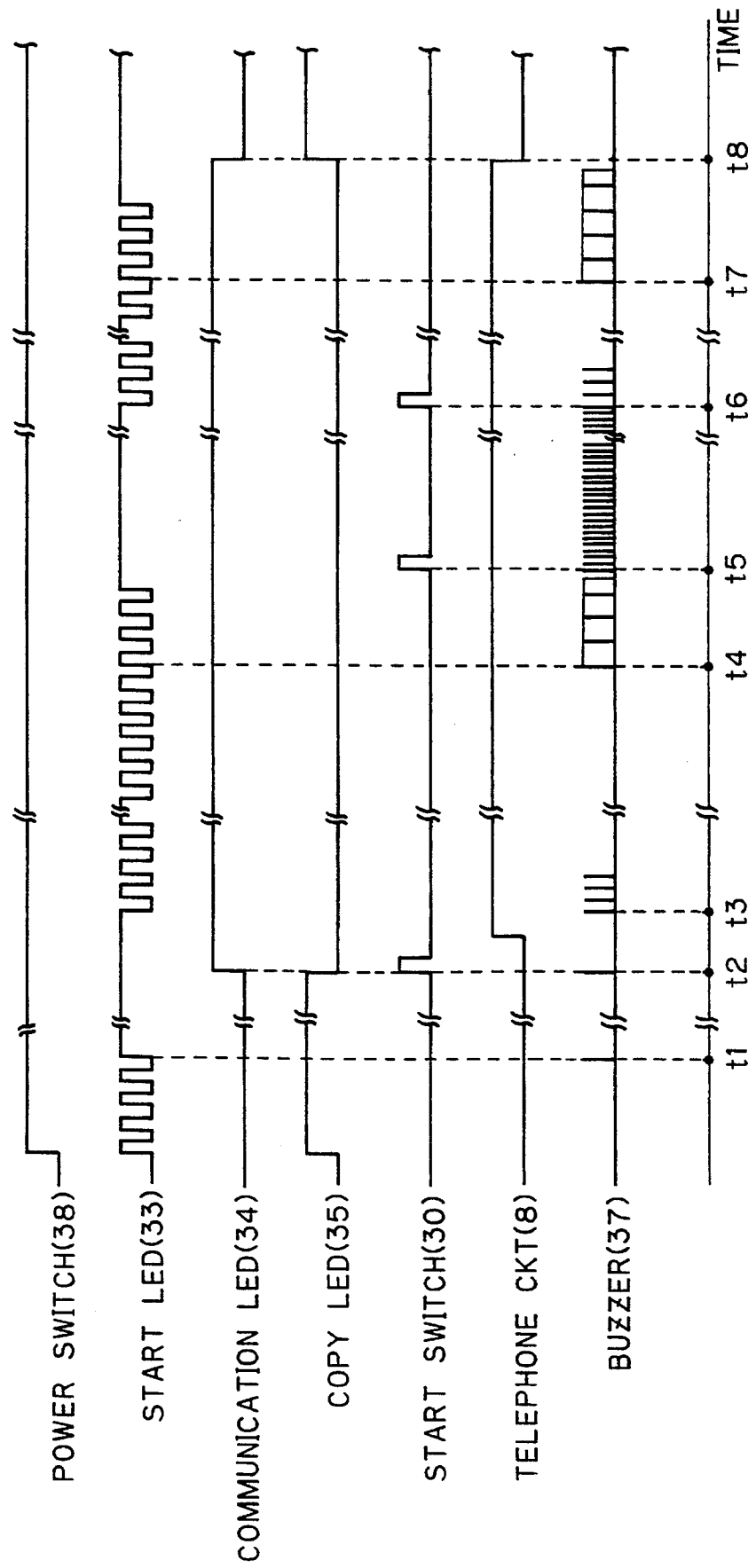
FIG. 11 shows timing charts for the sequence of FIG. 10.

When the power switch 38 of the image scanner 2 is switched on, the line sensor 57 begins to move into its initial position, during which the start LED 33 flashes on and off several times to indicate that the image scanner 2 is preparing for scanning (FIG. 11). When the line sensor 57 has been set in its initial position (t1), the buzzer 37 generates an alarm sound and, at the same time, the start LED 33 begins to emit continuously to indicate that the image scanner is ready for scanning and thus that the start switch 30 is enabled. Also, the copy LED 35 begins to emit continuously when the power switch 38 is switched on, thereby to indicate that a hard copy can be made of the image picked up by the image scanner 2.

When either of the start switches 30 or 45 is depressed after an address has been entered by means of the dialing keypad 40, the copy LED 35 is turned off, whereas the communication LED 34 is turned on and, at the same time, the buzzer 37 generates an alarm sound (t2). The fax-terminal 3 then accesses the telephone circuit 8, and the image scanner 2 starts scanning. When the image transmission commences after the brightness measurement has been completed, the buzzer 37 generates four alarm sounds at a frequency of 2 Hz and the start LED 33 again flashes on and off at the beginning of the transmission (t3), thereby to indicate that the image processing system is now in operation and thus any operation on the start switch would be ineffective.

When image signals of one frame have been transmitted (t4), the buzzer 37 generates five alarm sounds at a frequency of 1 Hz and each continuing for nearly one second, to indicate a time interval of five seconds. The five second timer 76 of the image scanner 2 clocks the five second time interval, and if the start switch 30 or 45 is depressed within this interval (for example, at time t5), the access of the fax-terminal 3 to the telephone circuit 8 will not be released even after the five second time interval has elapsed. That is, a reservation of the telephone circuit 8 for the next transmission will be recognized if made within five seconds after the completion of preceding transmission.

When the start switch 30 or 45 is depressed before the five second interval is up, the buzzer 37 begins to generate alarm sounds at a frequency of 4 Hz, and the 20 second timer 78 of the image scanner 2 starts clocking. While the 20 second timer 78 is clocking, the operator can position the next article whose image is to be transmitted, for example, by turning the pages of the book.

Thereafter, when the start switch 30 or 45 is depressed (t6), the image scanner starts scanning and transmitting the next image. If 20 seconds has passed since the start switch 30 or 45 was first depressed to reserve access for the next transmission, but neither the start switch 30 nor 45 has been depressed again, the image scanner 2 automatically starts scanning and transmission of the image present in the pick-up position.

If neither the start switch 30 nor 45 has been depressed when five seconds has passed after the completion of transmission of a preceding image, the access of the fax-terminal 3 to the telephone circuit 8 is released, so that the image processing system is reset to an initial condition. In FIG. 11, the second image transmission is completed at time t7, and thereafter the five second time interval has elapsed without the actuation of either of the start switches, so that the image processing system is reset to an initial condition at time t8. Any subsequent images can be transmitted one after the other in the same way as above without releasing the access to the telephone circuit 8 if the start switch is actuated within the five second time interval.

Because it is possible to operate only the image scanner 2 for the above-described successive image pick-up and transmission, the image processing system of the invention is very efficient and simple in operation.

In order to make hard copies of the images picked up and transmitted in succession, the image signals of these plurality of frames are sequentially read out from the frame memory 89 for printing after the access to the telephone circuit 8 is released, in the same way as above.

Although the invention has been described in detail with reference to preferred embodiments, various modifications within the scope and spirit of the invention will be apparent to persons skilled in this technological field. For example, the line sensor of the image scanner may be moved continuously in the image plane of the taking lens. As a further example, the line sensor of the image scanner may be replaced by a fixed area array of pixels occupying the image plane of the taking lens. In that case, the charges developed by the array of pixels could nonetheless be transmitted line-by-line to the signal processing circuit, in step with the clock pulses either generated from within the scanner (brightness check) or received from the fax-terminal (main imaging), as was described above. Thus, the invention should be considered as limited only by the scope of the appended claims.

What is claimed is:

1. A method for controlling an image processing system comprising an image scanner and a facsimile terminal connected to each other, said image scanner including an optical system and a line sensor for scanning an image of a remote subject formed by said optical system, said line sensor being moved in a direction perpendicular to a direction in which pixels of said line sensor are aligned, said method comprising the steps of:

establishing access of said facsimile terminal to a telephone circuit;

actuating a switch means thereby to start scanning an image of a remote subject by said image scanner in synchronism with a clock pulse signal supplied from said facsimile terminal and, if an original document is positioned in said facsimile terminal, to start scanning said original by said facsimile terminal;

transmitting image signals of said remote subject scanned by said image scanner to said facsimile terminal through said telephone circuit prior to or following transmission of image signals of said original document;

maintaining the access of said facsimile terminal to said telephone circuit for a predetermined time interval after said image signals have been completely transmitted;

reserving said telephone circuit thereby to continue the access to said telephone circuit over said predetermined time interval for awaiting transmission of image signals of a second image picked up by said image scanner; and releasing the access to said telephone circuit when said reserving step has not been executed within said predetermined time interval and said image signals of said remote subject and said image signals of said original document have been completely transmitted.

2. The method according to claim 1, wherein said image signals of said second image are transmitted upon a manual actuation of switch means or when a predetermined time interval has elapsed after said reserving step for said second image transmission has been preformed.

3. The method according to claim 1, further comprising the steps of:

storing said image signals of said remote subject in a memory while said image signals of said remote subject are transmitted; and actuating a printer of said facsimile terminal thereby to print out a hard copy according to said image signals stored in said memory after said step of releasing the access to said telephone circuit.

4. The method according to claim 1, further comprising the steps of:

actuating said switch means thereby to start scanning an image of said remote subject by said image scanner when the access to said telephone circuit has been released;

sending image signals of said remote subject to said facsimile terminal; and actuating a printer of said facsimile terminal thereby to print out a hard copy according to said image signals of said remote subject.

5. The method according to claim 4, wherein said switch means include start switches disposed on both said facsimile terminal and said image scanner.

6. The method according to claim 5, wherein said printer prints only a hard copy of said image of said remote subject scanned by said image out upon actuating said start switch disposed on said image scanner even when an original is set in said facsimile terminal, if the access to said telephone circuit has been released.

7. The method according to claim 6, wherein said printer prints out a copy of said original document upon actuating said start switch disposed on said facsimile terminal, if the access to said telephone circuit has been released.

8. A method for controlling an image processing system comprising an image scanner and a first facsimile terminal connected to each other, said image scanner including an optical system and a line sensor for scanning an image formed by said optical system, said line sensor being moved in a direction perpendicular to a direction in which pixels of said line sensor are aligned, said method comprising the steps of:

establishing access of said first facsimile terminal to a telephone circuit;

actuating a switch means to cause said image scanner to begin scanning an image of a remote subject;

transmitting image signals of said remote subject scanned by said image scanner to a remote facsimile terminal through said telephone circuit and, simultaneously, storing said image signals in a frame memory of said first facsimile terminal;

releasing access of said first facsimile terminal to said telephone circuit; and actuating a printer of said first facsimile terminal thereby to print out a hard copy of said remote subject according to said image signals stored in said frame memory of said first facsimile terminal.

9. A method for controlling image processing system comprising an image scanner and a first facsimile terminal connected to each other, said image scanner including an optical system and a line sensor for scanning an image formed by said optical system, said line sensor being moved in a direction perpendicular to a direction in which pixels of said line sensor are aligned, said method comprising the steps of:

establishing access of said facsimile terminal to a telephone circuit;

actuating a switch means to cause said image scanner to begin scanning a first image;

transmitting image signals of said first image scanned by said image scanner from said facsimile terminal through said telephone circuit;

maintaining the access of said facsimile terminal to said telephone circuit for a first predetermined time interval after said image signals of said first image have been completely transmitted;

effecting a reservation of said telephone circuit during said first predetermined time interval thereby to continue the access to said telephone circuit over a-second predetermined time interval during which said facsimile terminal awaits transmission of a second image picked up by said image scanner;

starting transmission of said second image upon a manual actuation or when said second predetermined time interval has elapsed; and releasing the access to said telephone circuit when said switch means have not been actuated within said first predetermined time interval.

* * * * *